United States Patent [19]

Bricker et al.

[11] Patent Number: 4,919,902

[45] Date of Patent: Apr. 24, 1990

[54] CATALYST FOR TREATMENT OF EXHAUST GASES FROM INTERNAL COMBUSTION ENGINES

[75] Inventors: Maureen L. Bricker, Buffalo Grove; R. Joe Lawson, Palatine, both of Ill.

[73] Assignee: Allied-Signal Inc., Morris Township, Morris County, N.J.

[21] Appl. No.: 269,389

[22] Filed: Nov. 9, 1988

Related U.S. Application Data

[62] Division of Ser. No. 102,967, Sep. 30, 1987, Pat. No. 4,791,091.

[51] Int. Cl.$^5$ .............................................. B01D 53/36
[52] U.S. Cl. .................................... 423/213.5; 423/210
[58] Field of Search ....................... 502/261, 262, 303; 423/213.5, 210, 245.3, 247

[56] References Cited

U.S. PATENT DOCUMENTS

| | | | |
|---|---|---|---|
| 2,620,314 | 12/1952 | Hoekstra | 502/8 |
| 3,767,453 | 10/1973 | Hoekstra | 502/439 |
| 3,873,469 | 3/1975 | Foster et al. | 502/242 |
| 4,170,573 | 10/1979 | Ernest et al. | 423/213.5 |
| 4,528,279 | 7/1985 | Suzuki et al. | 502/200 |
| 4,591,580 | 5/1986 | Kim et al. | 502/303 |
| 4,619,909 | 10/1986 | Ono et al. | 502/303 |
| 4,760,044 | 7/1988 | Joy, III et al. | 502/261 |
| 4,780,447 | 10/1988 | Kim et al. | 502/303 |
| 4,791,091 | 12/1988 | Bricker et al. | 423/213.5 |
| 4,839,146 | 6/1989 | Cho et al. | 423/213.5 |

*Primary Examiner*—Jeffrey E. Russel
*Attorney, Agent, or Firm*—Frank S. Molinaro; Harold N. Wells; Roger H. Criss

[57] ABSTRACT

This invention relates to a catalytic composite for treating an exhaust gas comprising a support which is a refractory inorganic oxide having dispersed thereon lanthanum, at least one other rare earth component and at least one noble metal component selected from the group consisting of platinum, palladium, rhodium, ruthenium and iridium. An essential feature of said catalytic composite is that the lanthanum be present as crystalline particles of lanthanum oxide which have an average crystallite size of less than about 25 Angstroms. The support may be selected from the group consisting of alumina, silica, titania, zirconia, aluminosilicates and mixtures thereof with alumina being preferred. Illustrative of the other rare earth components are cerium, neodymium, praeseodymium, dysprosium, europium, holmium and ytterbium. An important feature in manufacturing the catalytic composite is the dispersion of lanthanum oxide onto said refractory inorganic oxide support. In a specific example, lanthanum may be dispersed on alumina as follows. A solution of a lanthanum salt is mixed with a hydrosol of aluminum, particles are formed from said lanthanum containing hydrosol, calcined to form an inorganic oxide particle containing lanthanum oxide, ground to give a powder of alumina containing finely dispersed lanthanum oxide. This powder in turn can be mixed with another rare earth oxide such as cerium oxide to a slurry which in turn is used to coat a solid monolithic carrier. Finally, at least one noble metal component is dispersed on said coated solid monolithic carrier.

11 Claims, No Drawings

CATALYST FOR TREATMENT OF EXHAUST GASES FROM INTERNAL COMBUSTION ENGINES

This application is a division, of application Ser. No. 102,967, filed Sept. 30, 1987, now U.S. Pat. No. 4,791,091.

Gaseous waste products resulting from the combustion of hydrocarbonaceous fuels, such as gasoline and fuel oils, comprise carbon monoxide, hydrocarbons and nitrogen oxides as products of combustion or incomplete combustion, and pose a serious health problem with respect to pollution of the atmosphere. While exhaust gases from other carbonaceous fuel-burning sources, such as stationary engines, industrial furnaces, etc., contribute substantially to air pollution, the exhaust gases from automotive engines are a principal source of pollution. Because of these health problem concerns, the Environmental Protection Agency (EPA) has promulgated strict controls on the amounts of carbon monoxide, hydrocarbons and nitrogen oxides which automobiles can emit. The implementation of these controls has resulted in the use of catalytic converters to reduce the amount of pollutants emitted from automobiles.

In order to achieve the simultaneous conversion of carbon monoxide, hydrocarbon and nitrogen oxide pollutants, it has become the practice to employ catalysts in conjunction with air-to-fuel ratio control means which functions in response to a feedback signal from an oxygen sensor in the engine exhaust system. The air-to-fuel ratio control means is typically programmed to provide fuel and air to the engine at a ratio at or near the stoichiometric balance of oxidants and reductants in the hot exhaust gases at engine cruising conditions, and to a stoichiometric excess of reductants during engine startup and at engine acceleration conditions. The result is that the composition of the exhaust gases with which the catalyst is contacted fluctuates almost constantly, such that conditions to which the catalyst is exposed are alternatively net-reducing (fuel rich) and net-oxidizing (fuel lean). A catalyst for the oxidation of carbon monoxide and hydrocarbons and the reduction of nitric oxide must be capable of operating in such a dynamic environment.

Catalysts which can be used for this application are well known in the art and are normally referred to as three component control catalysts. For example, U.S. Pat. No. 4,528,279 describes the use of cerium/lanthanum promoters in conjunction with noble metals such as platinum and rhodium as the active phase of the catalyst. The purpose of adding promoters such as cerium or lanthanum is to improve the durability of the three component control catalysts after prolonged use on a vehicle. Thus, U.S. Pat. No. 4,528,279 teaches that the cerium/lanthanum ratio should be 0.05 to 0.3:1 in order to obtain optimum use of the rare earths. Additionally, the '279 patent states that rare earth oxides whose positive ion diameter is about two times that of the aluminum ion, are not likely to form a solid solution in alumina. Finally, the method of dispersing the lanthanum component onto the alumina is by impregnation.

Further, U.S. Pat. No. 4,591,580 teaches the use of a catalytic composite containing lanthana, ceria and an alkali metal oxide. Again the lanthanum component is impregnated onto the alumina support material.

Our characterization of prior art catalysts containing lanthanum oxide have shown that the lanthanum oxide crystallites are at least 50 Angstroms. The present invention, however, discloses a catalytic composite in which the lanthanum oxide has an average crystallite size of less than 25 Angstroms. These small crystallites are obtained by cogelling the lanthanum component with a support which is a refractory inorganic oxide, e.g. alumina. One beneficial effect of having these small lanthanum oxide crystallites is that the synergistic interaction between lanthanum oxide and the noble metal components, especially rhodium, is increased versus when the lanthanum oxide is present as larger crystallites. The specific result of the increased interaction is that the rhodium metal is able to convert nitric oxide to nitrogen more effectively after extended use than a catalyst of the prior art. Additionally, the presence of lanthanum oxide as small crystallites increases the thermal stability of the support such as alumina.

The improved durability of the rhodium component means that a smaller amount of rhodium would be required to achieve the same efficiency as the current state-of-the-art catalytic composites. This results in an economic savings because of the high cost of rhodium metal. Additionally, the improved efficiency can allow an automobile manufacturer to tune its vehicles for improved performance without concern about meeting the EPA regulations. Therefore, the instant invention provides several advantages over the catalytic composite of the prior art.

SUMMARY OF THE INVENTION

This invention relates to a catalytic composite and to a method of manufacturing said composite for the treatment of an exhaust gas from an internal combustion engine. The catalytic composite comprises a support which is a refractory inorganic oxide selected from the group consisting of alumina, silica, titania, zirconia, aluminosilicates and mixtures thereof, having dispersed thereon lanthanum oxide, at least one other rare earth oxide and at least one noble metal component selected from the group consisting of platinum, palladium, rhodium, ruthenium, and iridium. Additionally, the lanthanum oxide present in said catalytic composite is characterized as consisting of crystalline particles having an average crystallite size of less than about 25 Angstroms.

Accordingly, one embodiment of this invention is a catalytic composite which comprises a support which is a refractory inorganic oxide deposited on a solid metallic or ceramic honeycomb carrier, said support having dispersed thereon lanthanum oxide, said lanthanum oxide having an average crystallite size of less than about 25 Angstroms, at least one other rare earth oxide and at least one noble metal component selected from the group consisting of platinum, palladium, rhodium, ruthenium and iridium.

Thus a specific embodiment of the invention is a catalytic composite comprising an alumina support deposited on a monolithic carrier, said support having dispersed thereon lanthanum oxide, cerium oxide and platinum and rhodium metals.

Another embodiment of this invention is a catalytic composite which comprises a support which is a refractory inorganic oxide, said support present in the shape of pellets and having dispersed thereon lanthanum oxide having an average crystallite size of less than 25 Angstroms, and additionally having dispersed on said support at least one other rare earth oxide and at least one noble metal component selected from the group consisting of platinum, palladium, rhodium, ruthenium and iridium.

Accordingly, another specific embodiment of the invention is a catalytic composite comprising alumina spheres having dispersed thereon lanthanum oxide, cerium oxide and platinum plus rhodium.

A further embodiment of the invention is a method of manufacturing a catalytic composite comprising coating a metallic or ceramic solid honeycomb carrier with a support which is a refractory inorganic oxide, having dispersed thereon lanthanum oxide having an average crystallite size of less than about 25 Angstroms, and at least one other rare earth oxide, calcining the resultant coated honeycomb carrier, dispersing at least one noble metal component selected from the group consisting of platinum, palladium, rhodium and iridium onto said coated honeycomb carrier, calcining and recovering the resultant catalytic composite.

Thus, in a specific embodiment of said method of manufacturing a ceramic honeycomb carrier is coated with an alumina support having dispersed thereon lanthanum oxide having an average crystallite size of less than about 25 Angstroms, and cerium oxide, calcining the resultant coated honeycomb carrier, dispersing platinum and rhodium onto said calcined coated honeycomb carrier, calcining and recovering the resultant catalytic composite.

A further specific embodiment of said method of manufacturing is that said lanthanum oxide is dispersed on said alumina support by commingling a solution of a lanthanum salt with a hydrosol of aluminum, forming particles from said lanthanum-containing aluminum hydrosol, calcining said particles to form gamma alumina particles containing lanthanum oxide, grinding said calcined particles to yield an alumina powder containing lanthanum oxide particles having an average crystallite size of less than 25 Angstroms.

Other objects and embodiment will become more apparent after a more detailed description of the invention.

DETAILED DESCRIPTION OF THE INVENTION

As heretofore indicated, the present invention relates to a catalytic composite and a method of manufacturing said composite comprising a support which is a refractory inorganic oxide having dispersed thereon lanthanum oxide, at least one other rare earth oxide and at least one noble metal component selected from the group consisting of platinum, palladium, rhodium, ruthenium and iridium.

Accordingly, considering first the support utilized in the present invention, this support may be selected from the group consisting of alumina, silica, titania, zirconia, aluminosilicates, and mixtures thereof with alumina being preferred. When alumina is the desired support, it is preferable that the alumina have a specific surface area ranging from 75 to 200 $m^2/g$ and more preferably ranges from about 100 to about 180 $m^2/g$. It preferably also has a total pore volume ranging from 0.25 to 0.80 $cm^3/g$ and more preferably from 0.45 to 0.65 $cm^3/g$.

A second feature of the catalytic composite of this invention is that said support has dispersed thereon lanthanum oxide present as crystallites having an average crystallite size as determined by x-ray diffraction, of less than 25 Angstroms. The lanthanum oxide may be dispersed on said support by means such as coprecipitation or cogellation of a lanthanum compound and a precursor of said support.

A third feature of said catalytic composite is the presence of at least one other rare earth oxide. Illustrative of the rare earth oxides contemplated as within the scope of this invention are cerium oxide, praeseodymium oxide, neodymium oxide, dysprosium oxide, europium oxide, holmium oxide and ytterbium oxide. This additional rare earth oxide may be dispersed on said refractory inorganic oxide support in a number of ways well known in the art which will be discussed more fully herein.

The catalytic composite of the instant invention can be conveniently employed in particulate form or the catalytic composite can be deposited onto a solid monolithic carrier. When particulate form is desired, the catalytic composite can be formed into shapes such as pills, pellets, granules, rings, sphere, etc. The particulate form is especially desirable where large volumes of catalytic composites are needed, and for use in circumstances in which periodic replacement of the catalytic composite may be desired. In circumstances in which less mass is desirable or in which movement or agitation of particles of refractory inorganic oxide may result in attrition, dusting and resulting loss of disposed metals or undue increase in pressure drop across the particles, a monolithic form is preferred.

In the employment of a monolithic form, it is usually most convenient to employ the catalytic composite as a thin film or coating deposited on an inert carrier material which provides the structural support for said catalytic composite. The inert carrier material can be any refractory material such as ceramic or metallic materials. It is desirable that the carrier material be unreactive with the catalytic composite and not be degraded by the gas to which it is exposed. Examples of suitable ceramic materials include sillimanite, petalite, cordierite, mullite, zircon, zircon mullite, spodumene, alumina-titanate, etc. Additionally, metallic materials which are within the scope of this invention include metals and alloys as disclosed in U.S. Pat. No. 3,920,583 which are oxidation resistant and are otherwise capable of withstanding high temperatures.

The carrier material can best be utilized in any rigid unitary configuration which provides a plurality of pores or channels extending in the direction of gas flow. It is preferred that the configuration be a honeycomb configuration. The honeycomb structure can be used advantageously in either unitary form, or as an arrangement of multiple modules. The honeycomb structure is usually oriented such that gas flow is generally in the same direction as the cells or channels of the honeycomb structure. For a more detailed discussion of monolithic structures, refer to U.S. Pat. Nos. 3,785,998 and 3,767,453.

Another embodiment of this invention is a method of manufacturing said catalytic composite. The first step of this method of manufacturing consists of dispersing lanthanum oxide having an average crystallite size of less than 25 Angstroms onto said support. It is contemplated that the lanthanum oxide may be dispersed onto said support in a number of ways including coprecipitating or cogelling a lanthanum compound with a precursor of said support provided that such method result in lanthanum oxide with an average crystallite size of less than 25 Angstroms.

Thus, a preferred method of dispersing lanthanum oxide onto a refractory inorganic oxide is to modify the well known oil drop method which is taught in U.S. Pat. No. 2,620,314. When alumina is the desired refractory inorganic oxide support, the modified oil drop method comprises forming an aluminum hydrosol by any of the techniques taught in the art and preferably by reacting aluminum metal with hydrochloric acid; adding an aqueous solution of a decomposable lanthanum compound to said aluminum hydrosol; combining the resulting hydrosol mixture with a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging and drying treatments in oil and an ammoniacal solution to further improve their physical characteristics. The resulting aged and gelled particles are then washed and dried at a relatively low temperature of about 149°–205° C. and subjected to a calcination procedure at a temperature of about 455°–705° C. for a period of about 1 to about 20 hours. This treatment effects conversion of the hydrogel to the corresponding crystalline gamma-alumina containing lanthanum oxide in the form of crystallites whose average size is less than 25 Angstroms.

Any water soluble and decomposable lanthanum compound may be used in the above process including lanthanum chloride, lanthanum nitrate and lanthanum acetate. By a decomposable metal compound is meant a compound which, when heated in air at about 500° to about 750° C. for about 2 to 20 hours decomposes to the metal oxide, e.g. lanthanum oxide.

In order for the lanthanum oxide dispersed on said support to be effective, said lanthanum oxide should be present in a concentration from about 0.5 to about 15 weight percent of the support. Preferably, the concentration of lanthanum oxide should be from about 2 to about 10 weight percent of said support.

The spherical alumina or other support which contains lanthanum oxide can now be impregnated with an aqueous solution of a decomposable compound of at least one other rare earth metal, dried and heated in air. This gives a support which contains lanthanum oxide and at least one other rare earth oxide. Finally, the spherical support containing lanthanum oxide and at least one other rare earth oxide can now be impregnated with an aqueous solution of a decomposable noble metal compound, dried and heated in air to give a spherical catalytic composite. Details about what decomposable compounds may be used and other conditions for effecting said impregnation are similar to those for when a monolithic carrier is used and will be provided herein.

Alternatively, if a monolithic form is desired, the preferred method of preparation is as follows. The spherical support containing lanthanum oxide is ground, using standard grinding procedures such as hammer milling, into a powder having a particle size less than about 250 microns. This powder is now added to an aqueous solution containing a decomposable compound of at least one other rare earth metal, the resultant mixture is dried at a temperature of about 100° to about 150° C. and calcined (by calcined is meant heating in air) at a temperature of about 500° to about 750° C. for about 2 to about 20 hours to give a well dispersed rare earth oxide. It is contemplated as within the scope of this invention that the drying and calcining steps can be carried out in one step.

Alternatively, the ground powder may be added to a colloidal suspension of the desired rare earth oxide, dried and calcined as above. When a colloidal suspension is used, the crystallite size of the rare earth oxide is usually larger than when the rare earth is impregnated using a water soluble compound. Although both methods of preparation give adequate results, it has been found that using a colloidal suspension is preferred.

Since the spheres prepared by the oil drop method are ultimately ground to a powder, it is contemplated as within the scope of this invention that the oil drop method can be used to form irregular shaped particles. In this manner the parameters which must be controlled to form spheres are no longer critical. This has the economic advantage of increasing the rate of production of refractory inorganic particles which contain lanthanum oxide.

Illustrative of the rare earths which can be used in the present invention are cerium, praeseodymium, neodymium, dysprosium, europium, holmium and ytterbium. Additionally, examples of decomposable water soluble compounds of said rare earths are cerium acetate, neodymium acetate, europium acetate, holmium acetate, ytterbium acetate, praeseodymium acetate, dysprosium acetate, cerium formate, lanthanum formate, cerium nitrate, lanthanum nitrate, neodymium nitrate, europium nitrate, holmium nitrate, ytterbium nitrate, praeseodymium nitrate, dysprosium nitrate, cerium chloride, lanthanum chloride, neodymium chloride, europium chloride, holmium chloride, ytterbium chloride, praeseodymium chloride, dysprosium chloride. Regardless of how this other rare earth metal compound is applied to said refractory inorganic oxide support, the refractory inorganic oxide support containing lanthanum oxide and at least one other rare earth metal compound is dried and calcined in air at a temperature of about 400° to about 700° C. for about one to about 3 hours to a support which contains lanthanum oxide and at least one other rare earth oxide. The concentration of the rare earth oxide can vary considerably but is conveniently chosen to be from about 5 to about 35 weight percent of the support and more preferably from about 15 to about 25 weight percent of said support.

In the next step of this example of the method of preparation, a slurry is prepared using the support which contains lanthanum oxide and at least one other rare earth oxide. The slurry can be prepared by means known in the art such as combining the appropriate amounts of the support with an aqueous solution of an acid such as nitric, hydrochloric, sulfuric acid, etc. The resultant slurry is ball milled for about 2 to 6 hours to form a usable slurry. Other types of mills such as impact mills can be used to reduce the milling time to about 5 to 30 minutes. This slurry can now be used to deposit a thin film or coating onto the monolithic carrier by means well known in the art. One such method involves dipping the monolithic carrier into said slurry, blowing out the excess slurry, drying and calcining in air at a temperature of about 500° to about 700° C. for about 1 to about 4 hours. This procedure can be repeated until the desired amount of support containing lanthanum and at least one other rare earth on said monolithic carrier is achieved. It is preferred that the support, such as alumina, be present on the monolithic carrier in amounts in the range from about 28 g to about 355 g of support per liter of carrier volume, where the volume is measured by the exterior dimensions of the monolithic carrier structure.

It is additionally contemplated as within the scope of this invention that the additional rare earth may be dispersed onto the support containing lanthanum oxide after the support has been deposited on said monolithic carrier. Thus, a slurry is prepared from said support containing lanthanum oxide by means known in the art such as described above. This slurry is then applied to a monolithic carrier as described above to give a coating of said support on the monolithic carrier. Next at least one other rare earth oxide is dispersed on said support by impregnating said monolithic carrier coated with said support with an aqueous solution of a decomposable rare earth compound, dried and calcined. Alternatively, said monolithic carrier may be dipped into a colloidal suspension of the desired rare earth oxide, dried and calcined.

The final step in this example of the method of preparation is to disperse at least one noble metal component onto said support which is coated on said monolithic carrier. The noble metal may be chosen from the group consisting of platinum, palladium, rhodium, ruthenium or iridium and mixtures thereof. The noble metal may be deposited onto the support in any suitable manner. One example of a method of dispersing the noble metal onto the support involves impregnating the monolithic carrier which has a coating of said support with an aqueous solution of a decomposable compound of the desired noble metal or metals.

Illustrative of the decomposable compounds of said noble metals are chloroplatinic acid, ammonium chloroplatinate, hydroxy disulfite platinum (II) acid, bromoplatinic acid, platinum tetrachloride hydrate, dinitrodiamino platinum, sodium tetranitroplatinate, rhodium trichloride, hexaamminerhodium chloride, rhodium carbonylchloride, rhodium trichloride hydrate, rhodium nitrate, sodium hexachlororhodate, sodium hexanitrorhodate, chloropalladic acid, palladium chloride, palladium nitrate, diamminepalladium hydroxide, tetraamminepalladium chloride, hexachloroiridate (IV) acid, hexachloroiridate (III) acid, dichlorodihydrooxoiridate (III) acid, ammonium hexachloroiridate (III), ammonium aquohexachloroiridate (IV), tetraamminedichloroiridate (III) chloride, and aquotetraammineiridate (III) chloride, ruthenium tetrachloride, hexachlororuthenate, and hexaammineruthenium chloride. Of the compounds enumerated above, the following are preferred for dispersing the desired noble metal: chloroplatinic acid, rhodium chloride, chloropalladic acid, hexachloroiridate (IV) acid and hexachlororuthenate.

For three component control operation, it is desirable that the catalytic composite contain a combination of rhodium and platinum, palladium or mixtures thereof. Specific combinations include platinum and rhodium, palladium and rhodium and platinum, palladium and rhodium. However, under certain circumstances, e.g. when control of nitric oxide is not necessary, it is undesirable (from an economic consideration) for the catalytic composite to contain rhodium. In that case it is desirable for the catalytic composite to contain platinum, palladium and mixtures thereof.

When more than one noble metal is desired, the metals can be in a common aqueous solution or in separate aqueous solutions. When separate aqueous solutions are used, impregnation of said first support with said noble metal solutions can be performed sequentially in any order. Finally, hydrogen chloride, nitric acid or other suitable materials may be added to said solutions in order to further facilitate the uniform distribution of the noble metal components throughout said support.

When said support is to be deposited on a solid monolithic carrier, said support can be impregnated with said aqueous noble metal solution either before or after the support is deposited on said solid monolithic carrier. Of the two procedures, it is more convenient to impregnate the noble metal onto the support containing lanthanum oxide and at least one other rare earth oxide after it has been deposited on said solid monolithic carrier with an aqueous solution of the noble metal component, dried and calcined in air at a temperature of about 400° to about 500° C. for a time of about 1 to about 4 hours. It should be pointed out that the two methods of dispersing the noble metals may not yield equivalent catalytic composites.

It is preferable that said noble metal component be present in an amount ranging from about 0.01 to about 4 weight percent of the support. Specifically, in the case of platinum and palladium the range is 0.1 to 4 weight percent. In the case of rhodium, ruthenium and iridium the range is from about 0.01 to 2 weight percent.

As already stated, one of the advantages of the instant invention is that the well dispersed lanthanum oxide stabilizes the refractory inorganic oxide, especially alumina, at temperatures as high as 1250° C. Additionally, after a prolonged durability test at a temperature of 760° C., the catalytic composite of the instant invention is more effective at treating an exhaust gas from an internal combustion engine than a catalytic composite of the prior art. Particularly important is the ability of the catalytic composite of the present invention to convert the nitric oxide emissions from said exhaust gas to innocuous gases.

Finally, it is another embodiment of the instant invention to provide a process for the treatment of exhaust gases, especially exhaust gases from an internal combustion engine, which comprises contacting said gases with the catalytic composite described herein.

In order to more fully illustrate the advantages to be derived from the instant invention, the following examples are set forth. It is to be understood that the examples are only by way of illustration and are not intended as an undue limitation on the broad scope of the invention as set forth in the appended claims.

EXAMPLE I

This example describes the preparation of alumina spheres containing lanthanum oxide. The basic oil dropping procedure is that found in U.S. Pat. No. 2,620,314. To 1,250 ml of alumina sol containing 13.5 weight percent aluminum at an Al/Cl ratio of 1.4, there was added 43.1 g of LaCl3 .6H2O. This mixture was processed as described in the '314 patent to give gamma-alumina spheres containing 5 weight percent lanthanum oxide.

EXAMPLE II

The spheres from Example I were used to prepare a catalytic composite as follows. Thus, 3,145 g of the spheres were ground to a powder having an average particle size less than 250 microns. This powder was added to 2,783 g of a colloidal cerium oxide solution (20 weight percent Ce), 103.2 ml of concentrated $HNO_3$, and 3.1 liter deionized $H_2O$ and milled using an Eiger Model No. ABML-75 mill for 10 minutes.

An oval shaped cordierite monolith with a minor axis of 8 cm, a major axis of 14.3 cm, a length of 12 cm and having 400 square channels per square inch of facial area was dipped into the above described slurry. After dipping, the excess slurry was blown out with an air gun. The slurry coated monolith was calcined in air for about 1 hour at 540° C. The above described dipping, blow-out and calcining steps were repeated until the monolith containing 160 g of coating per liter of monolith volume.

Next the platinum and rhodium metals were impregnated onto the above-described washcoated monolith. The above-described monolith was dipped into an aqueous solution containing 1.40 mg of platinum (in the form of chloroplatinic acid) per gram of solution and 0.06 mg of rhodium (in the form of rhodium chloride) per gram of solution. After dipping, the excess solution was blown out with an air gun, dried and calcined for about one hour at 540° C. This catalytic composite was designated Catalyst A. The calculated composition of Catalyst A in units of weight percent of alumina was Pt=1.0%, Rh=0.05%, Ce=19.4% and La=5.3%. Catalyst A contained 120 g of $Al_2O_3$ per liter of carrier volume.

EXAMPLE III

The conventional catalytic composite was prepared by the following method. In a beaker, 6,300 grams of pseudo-boehmite alumina and 10,800 grams of an aqueous solution of $LaCl_3 \cdot 6H_2O$ (3.1 weight percent La) were mixed, stirred for 30 minutes, transferred to a shallow tray, dried for 4 hours at 150° C. and finally calcined in air at 600° C. for 1 hour. 4,000 g of calcined alumina/lanthanum oxide powder was next stirred into a container which contained 3,565 mL of a colloidal cerium oxide solution (20 weight percent Ce), 246.2 g of concentrated $HNO_3$, and 4 liters deionized $H_2O$ and milled using an Eiger Model No. ABML-75 mill for 10 minutes.

An oval shaped cordierite monolith with a minor axis of 8 cm, a major axis of 14.3 cm, a length of 12 cm and having 400 square channels per square inch of facial area was dipped into the above-described slurry. After dipping, the excess slurry was blown out with an air gun. The slurry coated monolith was calcined for about 1 hour at 540° C. The above-described dipping, blow-out and calcining steps were repeated until the monolith contained 160 g of coating per liter of monolith volume.

Next the platinum and rhodium metals were impregnated onto the above-described washcoated monolith. The above-described monolith was dipped into an aqueous solution containing 1.40 mg of platinum (in the form of chloroplatinic acid) per gram of solution and 0.06 mg of rhodium (in the form of rhodium chloride) per gram of solution. After dipping, the excess solution was blown out with an air gun and calcined for about one hour at 540° C. This catalytic composite was designated Catalyst B. The calculated composition of Catalyst B in units of weight percent of alumina was Pt=1.0%, Rh=0.05%, Ce= 19.4% and La=5.3%. Catalyst B contained 120 g $Al_2O_3$ per liter of carrier volume.

EXAMPLE IV

Spheres were prepared as in Example I and were characterized as follows. The surface area of the lanthanum containing spheres was found to be in the range of 140-170 $m^2/g$. The pore volume of said spheres was 0.467 cc/g of sample. A sample of said spheres was ground into a powder and analyzed by x-ray diffraction to determine the identity of the crystalline species. The x-ray diffraction pattern only showed the presence of gammaalumina. This means that all of the lanthanum is well dispersed and the particles are smaller than 25 Angstroms (the detection limit of the x-ray diffraction technique).

A second sample of the spheres was treated at 1100° C. for 2 hours in an atmosphere of 10% steam and 90% air. After this treatment the surface area was found to be 76 $m^2/g$ and the pore volume was 0.204 cc/g of sample. Additionally, x-ray diffraction showed that theta-alumina was the major alumina phase with some gamma and delta alumina present. No lanthanum species were detected.

A third sample of spheres was treated at 1250° C. for 2 hours in an atmosphere of 10% steam and 90% air. After this treatment the surface area was found to be 38 $m^2/g$ and the pore volume was 0.101 cc/g of sample.

EXAMPLE V

An alumina powder was impregnated with $La(NO_3)_3 \cdot 6H_2O$ as described in Example III. This sample had a surface area of 260 $m^2/g$ and a pore volume of 0.74 cc/g. X-ray diffraction analysis showed the presence of gamma alumina and lanthanum oxycarbonate. The reason lanthanum oxycarbonate was formed instead of lanthanum oxide is that the impregnated material was calcined in a gas fired furnace which exhaust contains unburned methane and carbon monoxide.

A second sample of the lanthanum containing alumina powder was treated at 1100° C. for 2 hours in a 10% steam and 90% air atmosphere. After this treatment, the surface area of the powder was 90 $m^2/g$ and the pore volume was 0.510 cc/g. The x-ray diffraction pattern showed the presence of theta alumina as the major phase and $LaAlO_3$, gamma, delta and alpha alumina as minor phases.

Finally, a third sample of sad lanthanum containing alumina powder was treated at 1250° C. for 2 hours in a 10% steam and 90% air atmosphere. After this treatment, the surface area was 6 $m^2/g$ and the pore volume was 0.015 cc/g.

Comparing the results from Example V to those in Example IV, we observe that the composite of the present invention does not form $LaAlO_3$ at elevated temperatures and stabilizes the alumina more effectively at temperatures as high as 1250° C. than the composite of the prior art.

EXAMPLE VI

A reference catalytic composite was prepared by the following method. In a beaker, 5000 grams of pseudo-boehmite alumina and 13,562 grams of a solution of cerium acetate (7 weight percent cerium) were mixed, stirred for 30 minutes, transferred to a shallow tray, dried for 4 hours at 150° C. and finally calcined at 600° C. for 1 hour. The calcined alumina/cerium oxide powder was next stirred into a container which contained 5.33 liters of water and 48 mL of concentrated nitric acid ($HNO_3$). This mixture was ball milled for 4 hours.

An oval shaped cordierite monolith with a minor axis of 8 cm, a major axis of 14.3 cm, a length of 12 cm and having 400 square channels per square inch of facial area was dipped into the above described slurry. After dipping, the excess slurry was blown out with an air gun. The slurry coated monolith was calcined for about 1 hour at 540° C. The above described dipping, blow-out and calcining steps were repeated until the monolith contained 8 g of coating per liter of monolith volume.

Next the platinum and rhodium metals were impregnated onto the above-described washcoated monolith. The above-described monolith was dipped into an aqueous solution containing 1.40 mg of platinum (in the form of chloroplatinic acid) per gram of solution and 0.06 mg of rhodium (in the form of rhodium chloride) per gram of solution. After dipping, the impregnated monolith was dried and calcined for about one hour at 540° C. This catalytic composite was designated Catalyst C. The calculated composition of Catalyst C. in units of weight percent of alumina was Pt=1.0%; Rh=0.05%; and Ce=19.4%. Catalyst C. contained 120 g $Al_2O_3$ per liter of carrier volume.

EXAMPLE VII

Samples of Catalyst A and C were prepared as per Examples II and VI. Each was mounted in a converter and placed in the exhaust stream of a gasoline fueled engine. This was accomplished by placing one converter in the exhaust stream from one bank of a V-8 engine and the other converter in the exhaust stream from the other bank of a V-8 engine. The engine was operated according to the following cycle.

The engine used for this durability cycle was a Ford 5.0 L V-8 engine equipped with duel throttle body fuel injector. The durability cycle consisted of a 60 second cruise mode and a 5 second fuel cut mode. During the cruise mode, the engine operated at stoichiometry while during the fuel cut mode, the engine operated at a fuel lean condition that included a temperature and an oxygen spike. The fuel cut mode is achieved by breaking the circuit between one of the fuel injectors and the Electronic Engine Control. The engine speed and load on the engine was adjusted to give an exhaust gas temperature at 760° C. during the cruise mode and 704° C. during the fuel cut mode. This cycle was repeated for 100 hours.

EXAMPLE VIII

Samples of Catalysts B and C were prepared as per Examples III and VI and durability tested as per Example VII.

EXAMPLE IX

Catalysts A and C of Example VII and Catalysts B and C of Example VIII were evaluated in their fresh state, after 20 hours and after 100 hours of exposure on the durability cycle of Example VII. The evaluation test was performed using an engine dynamometer which measures the performance of the catalyst (hydrocarbon, carbon monoxide, and nitric oxide) as a function of air/fuel (A/F). The test involved evaluating the catalyst at seven different A/F ratio points (14.71, 14.66, 14.61, 14.56, 14.51, 14.46 and 14.41) at an inlet temperature of 450° C. At each A/F point, the air/fuel was oscillated plus or minus 0.1 A/F at one Hertz frequency. Conversions of hydrocarbon, carbon monoxide and nitric oxides were calculated at each A/F and then an integral performance conversion was obtained by averaging all the conversions.

Since a sample of the reference catalyst (Catalyst C) was durability tested and evaluated with Catalyst A, the catalyst of the instant invention, and Catalyst B, the catalyst of the prior art, a relative difference was obtained between Catalysts A and B. This relative difference was calculated as follows. First the conversion of Catalyst C was subtracted from the conversion of Catalyst A. This difference was labeled X. Next the conversion of Catalyst C was subtracted from the conversion of Catalyst B. This difference was labeled Y. Finally, Y was subtracted from X to give the relative difference between Catalysts A and B.

Thus, if A-B (obtained from X-Y) is a positive number, that means that Catalyst A is a more effective catalyst than Catalyst B at converting the pollutants to innocuous gases while a negative number means that Catalyst A is a less effective catalyst than Catalyst B. The results of these evaluations are presented in Table 1.

TABLE 1

| Hours on Durability Cycle | Relative Differences Between Catalysts A and B (A-B) Integral Performance (%) | | |
|---|---|---|---|
| | HC | CO | NOx |
| 0 | 2 | 1 | 3 |
| 20 | 4 | 0 | 2 |
| 100 | 2 | −2 | 7 |

The results presented in Table 1 clearly show that after 100 hours of durability testing, the catalyst of the instant invention (Catalyst A) is more effective at converting the nitric oxides to innocuous gases than the catalyst of the prior art (Catalyst B). The difference observed for hydrocarbon and carbon monoxide conversion is within the experimental error of the evaluation test and thus the two catalysts are equivalent with respect to these two pollutants. Therefore, the catalyst of the instant invention shows unexpected results over the catalyst of the prior art.

EXAMPLE X

Catalysts A and C of Example VII and Catalysts B and C of Example VIII were evaluated in their fresh state, after 20 hours and after 100 hours of exposure on the durability cycle of Example VII. The evaluation test was a continuous temperature traverse test at an A/F ratio of approximately 14.55. During this test the temperature of the exhaust gas going into the converter was continuously varied from 200° C. to 460° C. by varying the heat transfer rate of a stainless steel heat exchanger. Conversion of hydrocarbon, carbon monoxide and nitric oxides were calculated as a function of temperature. The time required to reach 25% conversion is a common criterion used to evaluate catalytic composites (referred to as light off performance) and is reported here. The results of these evaluations are presented in Table 2.

The results presented in Table 2 were obtained as described in Example IX. For the results in Table 2, a negative number means that Catalyst A (the catalyst of the instant invention) reached 25% conversion at a lower temperature than Catalyst B (the catalyst of the prior art). Thus, a negative number means that Catalyst A is more active, i.e. an improved catalyst than Catalyst B.

TABLE 2

| Hours on Durability Cycle | Relative Difference in T25* Between Catalysts A and B (A-B) | | |
|---|---|---|---|
| | HC | CO | NOx |
| 0 | −40 | −53 | −66 |
| 20 | −19 | −19 | −19 |
| 100 | −26 | −34 | −38 |

*Temperature (°C.) Required to Reach 25% Conversion

The results indicate that the catalytic composite of the present invention (Catalyst A) reaches 25% conversion of hydrocarbon, carbon monoxide and nitric oxide at a much lower temperature than the catalyst of the prior art (Catalyst B). The magnitude of the difference between Catalysts A and B is quite large indicating that Catalyst A has substantially better activity than Catalyst B. Additionally, this improved activity is observed when the catalysts are both fresh and after 100 hours of durability testing. Therefore, the catalyst of the present invention shows unexpected results over the catalyst of the prior art.

We claim as our invention:

1. A process for the treatment of exhaust gases which comprises contacting said gases with a catalytic composite comprising a support which is a refractory inorganic oxide selected from the group consisting of alumina, silica, titania, zirconia, aluminosilicates and mixtures thereof, having dispersed thereon lanthanum oxide, the lanthanum oxide being dispersed on said support by the method of commingling a solution of a lanthanum salt with a hydrosol of the metal precursor of said support, forming particles from said lanthanum containing hydrosol, calcining said particles to form a particulate support containing lanthanum oxide, having an average crystallite size of less than 25 Angstroms, at least one other rare earth oxide and at least one noble metal component selected from the group consisting of platinum, palladium, rhodium, ruthenium and iridium.

2. The process of claim 1 wherein said support is in the shape of pellets.

3. The process of claim 1 where said support is deposited on a metallic or ceramic monolithic honeycomb carrier.

4. The process of claim 1 wherein said support is alumina.

5. The process of claim 1 wherein said noble metal component is platinum, palladium or a mixture thereof, each metal present in a concentration in the range of from about 0.1 to about 4 weight percent of said support and optionally rhodium in a concentration of about 0.01 to about 2 weight percent of said support.

6. The process of claim 5 wherein the noble metals are a mixture of platinum and rhodium.

7. The process of claim 5 wherein the noble metals are a mixture of palladium and rhodium.

8. The process of claim 5 wherein the noble metals are a mixture of platinum, palladium, and rhodium.

9. The process of claim 1 wherein said lanthanum oxide is present in a concentration of about 0.5 to about 15 weight percent of said support.

10. The process of claim 1 wherein said rare earth oxide is cerium oxide which is present in a concentration of about 5 to about 35 weight percent of said support.

11. The process of claim 1 where said exhaust gas is from an internal combustion engine.

* * * * *